(12) United States Patent
Izumi et al.

(10) Patent No.: US 6,788,376 B2
(45) Date of Patent: Sep. 7, 2004

(54) ACTIVE MATRIX SUBSTRATE, METHOD FOR FABRICATING THE SUBSTRATE AND LIQUID CRYSTAL DISPLAY DEVICE

(75) Inventors: Yoshihiro Izumi, Kashihara (JP); Yoshimasa Chikama, Kyoto-fu (JP); Hisao Ochi, Mie-ken (JP)

(73) Assignee: Sharp Kabushiki Kaisha, Osaka (JP)

( * ) Notice: Subject to any disclaimer, the term of this patent is extended or adjusted under 35 U.S.C. 154(b) by 351 days.

(21) Appl. No.: 09/768,725

(22) Filed: Jan. 24, 2001

(65) Prior Publication Data

US 2001/0010566 A1 Aug. 2, 2001

(30) Foreign Application Priority Data

Jan. 27, 2000 (JP) ........................................ 2000-018750
Oct. 6, 2000 (JP) ........................................ 2000-307927

(51) Int. Cl.[7] .................... G02F 1/1343; G02F 1/136
(52) U.S. Cl. .................................... 349/139; 349/43
(58) Field of Search ..................... 349/139, 42–43; 257/59, 72, 347

(56) References Cited

U.S. PATENT DOCUMENTS 5,706,064 A * 1/1998 Fukunaga et al. ............ 349/43
5,986,724 A * 11/1999 Akiyama et al. ............. 349/41

FOREIGN PATENT DOCUMENTS

JP  2000-174012  *  6/2000

OTHER PUBLICATIONS

"ITO Thin Film Formation by Sol–Gel Method", Journal of the Ceramic Society of Japan, vol. 102, No. 2, pp. 200–205 (1994) (Abstract Only).

"Effects of UV Irradiation on the Formation of Oxide Thin Films from Chemically Modified Metal–Alkoxides", Journal of Sol–Gel Science and Technology, 2, pp. 581–585 (1994).

* cited by examiner

*Primary Examiner*—Dung Nguyen
(74) *Attorney, Agent, or Firm*—David G. Conlin; David A. Tucker; Edwards & Angell, LLP

(57) ABSTRACT

Pixel electrode fabricating processes are remarkably reduced. A pixel electrode 22 is formed without using any vacuum film forming apparatus by employing a sol-gel material and coating an insulating substrate with the sol-gel material by a spin-coating method or a dipping method, and this allows the fabricating processes to be reduced. During this course, by forming the pixel electrode before the formation of a scanning electrode 23, signal wiring lines and a TFT 24, the electrode wiring and the TFT 24 suffer no thermal damage even if they have a heat resistance temperature of about 350° C. Furthermore, by using a sol-gel material having photosensitivity, patterning processes are reduced by the elimination of the photoresist patterning process and the etching process. An investment for the equipment of a fabricating apparatus can thus be reduced to allow the cost reduction of the active matrix substrate itself to be achieved.

13 Claims, 5 Drawing Sheets

ACTIVE MATRIX SUBSTRATE, METHOD FOR FABRICATING THE SUBSTRATE AND LIQUID CRYSTAL DISPLAY DEVICE

BACKGROUND OF THE INVENTION

The present invention relates to an active matrix substrate that can be used for flat panel type display devices such as a liquid crystal display device (LCD), an electrochromic display device (ECD) and an electroluminescent display device (ELD) and flat panel type image sensors such as an X-ray image sensor and a contact type image sensor, a method for fabricating the active matrix substrate and a liquid crystal display device that employs the active matrix substrate.

In an active matrix substrate to be used for flat panel type display devices represented by the LCD, electrode wiring lines (scanning electrodes and signal electrodes) are provided in a matrix form on an insulating substrate, and an active element (thin film transistor (TFT), for example) and a pixel electrode are provided at each intersection of the lines.

FIG. 4 is a longitudinal sectional view showing a representative structure of an active matrix substrate to be used for a transmission type LCD. With regard to this active matrix substrate, a pixel electrode 9 is normally constructed of a transparent conductive film made of ITO (Indium Tin Oxide). In the above case, ITO is formed by a vacuum film forming technique of sputtering or the like.

In FIG. 4 are shown a glass substrate 1, a scanning electrode 2, a gate electrode 3 connected to the scanning electrode 2, a gate insulating film 4, a channel layer 5, a contact layer 6, a source electrode (signal electrode) 7, a drain electrode 8 and an insulative protecting film 10. Then, the gate electrode 3, gate insulating film 4, channel layer 5, contact layer 6, source electrode 7 and drain electrode 8 constitute a TFT 11.

However, the aforementioned conventional active matrix substrate has the problems as follows. That is, in order to pattern the transparent conductive film formed as described above by the vacuum film forming technique into the shape of the pixel electrode 9, it is required to carry out an ITO film forming process comprised of (1) film formation by sputtering, a photoresist patterning process comprised of (2) resist coating, (3) pre-bake, (4) exposure, (5) development and (6) post-bake and an etching and resist stripping process comprised of (7) etching, (8) resist stripping and (9) cleaning, as shown in FIG. 5, and this means that many processes from the (1) film formation by sputtering through to the (9) cleaning are required.

Lately, an increasing number of LCD's are used for a number of devices such as computers, portable terminal devices, television sets and so on, and it is expected that the flat panel type display devices will have an increasing demand in future. As concerns the increasing demand, it is required to reduce the cost of the active matrix substrates to be used for the flat panel type display devices.

However, the conventional active matrix substrate needs many processes for the reason that the transparent conductive film formed by the vacuum film forming technique is subjected to patterning when forming the pixel electrodes 9 as described hereinabove, and this impedes the achievement of the reduction in cost of the active matrix substrates.

SUMMARY OF THE INVENTION

Accordingly, the object of the present invention is to provide an active matrix substrate capable of remarkably reducing the fabricating processes of the pixel electrodes, a method for fabricating the active matrix substrate and a liquid crystal display device.

In order to achieve the above object, according to the first inventive aspect, there is provided an active matrix substrate having electrode wiring lines arranged in a matrix form, a plurality of active elements provided at intersections of the electrode wiring lines and a plurality of pixel electrodes connected to the electrode wiring lines via the active elements on an insulating substrate, wherein the pixel electrodes are formed of a transparent conductive oxide film made of a sol-gel material.

According to the above construction, a sol-gel material capable of being coated on the substrate by the spin-coating method or the dipping method is employed as a pixel electrode material. Therefore, transparent pixel electrodes can be formed without using any vacuum film forming apparatus, and the fabricating processes of the pixel electrodes are reduced.

In one embodiment, no constituent member of the electrode wiring lines and the active elements exists between the pixel electrodes and the active matrix substrate.

In one embodiment, the pixel electrodes are formed in a process preceding processes of forming the electrode wiring lines and the active elements.

According to the above construction, no constituent member of the electrode wiring lines and the active matrix elements exists on the substrate in the pixel electrode forming stage. Therefore, the pixel electrode can be formed without regard to the heat resistance temperatures of these components. Accordingly, the transparent electrode oxide film formed of the sol-gel material that requires high-temperature baking at a temperature of about 500° C. can be employed as a material for the pixel electrodes.

In general, the sol-gel material requires high-temperature baking at a temperature of about 500° C. in the film forming stage for the removal of the residual organic matter. However, according to the above construction, the pixel electrodes are firstly formed, and the electrode wiring lines and the active elements are subsequently formed. Therefore, even if the heat resistance temperature of the electrode wiring lines and the active elements is about 300° C., an active matrix substrate is formed without inflicting thermal damage to the components. In this case, if the electrode wiring lines and the active elements are firstly formed, then there occurs the problem that the metal constituting the electrode wiring lines and the semiconductor of a-Si (amorphous silicon) or the like constituting the active elements are disadvantageously deteriorated in the high-temperature baking stage of the sol-gel material.

If the high-temperature baking is performed at a temperature of about 500° C. during the active matrix substrate fabricating processes, then the substrate is sometimes slightly deformed in size in accordance with the expansion and contraction reactions of the foundation glass substrate. If such a high-temperature process exists in the active matrix substrate fabricating processes, then there occurs the problem that the pattern superposition accuracy is degraded before or after the process. However, in the case of the aforementioned construction, the electrode wiring lines and the active elements are formed after the formation of the pixel electrodes. Therefore, even if the substrate is deformed in size in the pixel electrode forming stage, the pattern superposition accuracy of the pixel electrodes, the electrode wiring lines and the active elements is not degraded by superposing the patterns of the electrode wiring lines and the active elements on the basis of the pixel electrode pattern.

In one embodiment, the pixel electrodes are treated with heat at a temperature higher than those of the electrode wiring lines and the active elements.

According to the above construction, the transparent conductive oxide film formed of the sol-gel material is treated with heat at a temperature (about 500° C.) higher than the temperature (the maximum temperature is normally about 350° C.) at which the electrode wiring lines and the active elements are formed. Therefore, the residual organic matter in the sol-gel material can be sufficiently decomposed and removed, and this allows a high-quality transparent conductive oxide film to be obtained.

In one embodiment, the pixel electrodes are principally made of any one of indium tin oxide, tin oxide, indium oxide, zinc oxide, germanium oxide and titanium oxide or a mixture of these substances.

The metal oxides of ITO, $SnO_2$, indium oxide, zinc oxide, germanium oxide and titanium oxide, which can be easily formed by the sol-gel method and exhibit transparency and conductivity, are appropriate as a material for the pixel electrode.

In particular, the substances of ITO and $SnO_2$ can be easily provided with a corrosion resistance to chemical liquids and gases necessary for the processes of processing the other members constituting the active matrix substrate. For example, the substances of ITO and $SnO_2$ have a resistance to chemical liquids and gases (etching liquid and etching gas of metal and semiconductor materials, photoresist, developing liquid, resist stripper, substrate cleaning liquid and so on) other than some acids such as HCl and HBr. According to the aforementioned construction, the substances of ITO and $SnO_2$ or these substances doped with Sb are used as principal materials. This accordingly makes it easy to firstly form the pixel electrodes and subsequently form the electrode wiring lines and the active elements. Furthermore, doping the substances of ITO and $SnO_2$ with Sb also enables the reduction in resistance of the transparent conductive oxide film.

The substance of $SnO_2$, which has a strong corrosion resistance and is hard to be patterned, has not conventionally been employed for the pixel electrodes of the active matrix substrate. However, employing the sol-gel material that has photosensitivity as described above facilitates patterning and enables the application of the material to the pixel electrodes. The substance of $SnO_2$ has a transmittance to visible light superior to that of the aforementioned ITO. Therefore, by employing the substance of $SnO_2$ for the pixel electrodes, an active matrix substrate having an excellent transmittance is formed.

According to the second inventive aspect, there is provided an active matrix substrate fabricating method for fabricating an active matrix substrate having electrode wiring lines arranged in a matrix form, a plurality of active elements provided at intersections of the electrode wiring lines and a plurality of pixel electrodes connected to the electrode wiring lines via the active elements on an insulating substrate, comprising the step of:

forming the pixel electrodes of a sol-gel material in a process preceding processes of forming the electrode wiring lines and the active elements.

According to the above construction, by adopting the sol-gel material capable of being coated as a pixel electrode material by the spin-coating method or the dipping method, the vacuum film forming apparatus is not required to be used, and the pixel electrode fabricating processes are reduced, similarly to the aforementioned first inventive aspect. Furthermore, the electrode wiring lines and the active elements are formed after the formation of the pixel electrodes. Therefore, even if the heat resistance temperature of the electrode wiring lines and the active elements is about 300° C., an active matrix substrate is formed without inflicting thermal damage to the components.

According to the third inventive aspect, there is provided an active matrix substrate fabricating method for fabricating an active matrix substrate having electrode wiring lines arranged in a matrix form, a plurality of active elements provided at intersections of the electrode wiring lines and a plurality of pixel electrodes connected to the electrode wiring lines via the active elements on an insulating substrate, comprising the step of:

forming the pixel electrodes by patterning a sol-gel material having photosensitivity.

According to the above construction, the sol-gel material employed as a material for the pixel electrodes has photosensitivity. Therefore, neither the photoresist patterning process nor the etching process is needed in patterning the transparent conductive oxide film into the pixel electrode shape, and the processes are reduced further than in the case of the conventional patterning with photoresist. Therefore, the pixel electrode fabricating processes are reduced.

In one embodiment, a chelating agent for imparting photosensitivity is added to the sol-gel material.

If the gel film is formed by using the metal alkoxide chemically modified with the chelating agent, the gel film has a resolution significantly changed by ultraviolet irradiation. That is, the gel film to which ultraviolet rays are irradiated has its chelate bond severed and becomes insoluble to alkaline solutions and alcohol. According to the above construction, the chelating agent is added to the sol-gel material employed as the material of the pixel electrodes. Therefore, photosensitivity is easily imparted to the sol-gel material.

In one embodiment, a photosensitive resin for imparting photosensitivity is added to the sol-gel material.

According to the above construction, the sol-gel material employed as the material of the pixel electrodes is blended with the photosensitive resin at an appropriate ratio, by which photosensitivity is easily imparted to the sol-gel material. For example, if ultraviolet rays are irradiated to a precursor film of a material obtained by blending the sol-gel material with a monomer having photopolymerizability and a polymerization initiator, the monomer is polymerized to form a reticulated polymer network, where the sol-gel material exists in the spaces of the polymer network. Therefore, by subsequently performing a development process, only the film of the polymerized portion to which ultraviolet rays have been irradiated remains as a negative pattern, and the sol-gel material in the portion that has not undergone irradiation is dissolved in the developing fluid together with the unpolymerized monomer.

According to the fourth inventive aspect, there is provided a liquid crystal display device including any one of the above active matrix substrates.

According to the above construction, the active matrix substrate of which the pixel electrode fabricating processes are reduced for the achievement of cost reduction is employed to achieve cost reduction of the liquid crystal display device.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
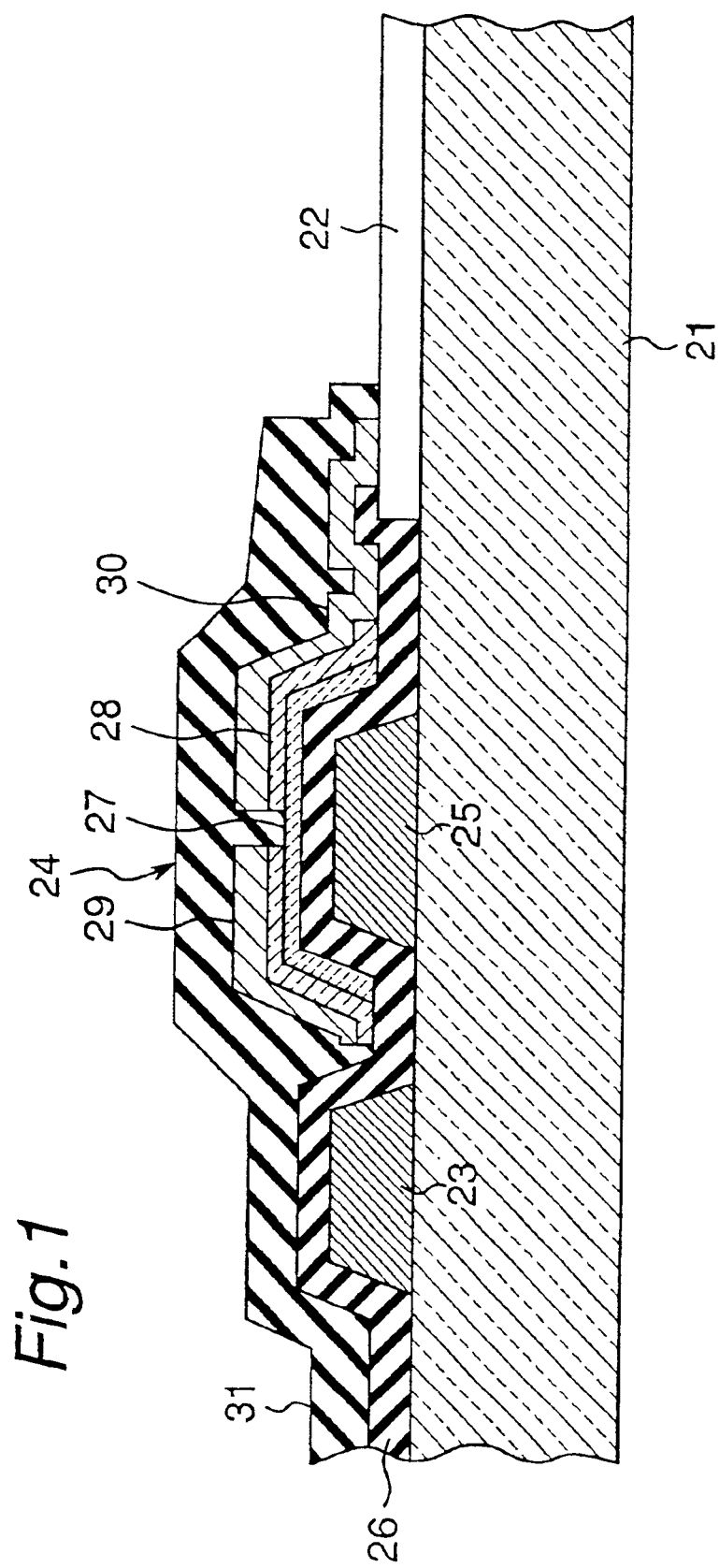
FIG. 1 is a sectional view of an active matrix substrate of the present invention.

The present invention will be described in detail below on the basis of the embodiments thereof shown in the drawings.

FIG. 1 is a longitudinal sectional view of an active matrix substrate of the present embodiment. In the active matrix substrate of the present embodiment, pixel electrodes 22, scanning electrodes 23 and signal electrodes (not shown) arranged in a matrix form, TFT's 24 that serve as a plurality of active elements provided at the intersections of the electrodes are formed on a glass substrate 21 that serves as an insulating substrate. In this case, the pixel electrodes 22 are formed on the glass substrate 21 prior to the formation of electrode wiring lines constructed of the scanning electrodes 23 and signal electrodes, and the TFT's 24.

In FIG. 1 are shown a gate electrode 25 connected to the scanning electrode 23, a gate insulating film 26, a channel layer 27, a contact layer 28, a source electrode 29 connected to the signal electrode, a drain electrode 30 and an insulative protecting film 31. The gate electrode 25, gate insulating film 26, channel layer 27, contact layer 28, source electrode 29 and drain electrode 30 constitute the TFT 24.

The active matrix substrate having the aforementioned sectional construction is formed as follows.

(Formation of Pixel Electrode 22)

The pixel electrode 22 is formed as follows. That is, firstly, a pixel electrode pattern (having a thickness of about 0.1 $\mu$m) constructed of a transparent conductive oxide film of ITO, $SnO_2$ or the like is formed on a surface of the glass substrate (#1737 produced by Corning Corp.) 21. In this case, the transparent conductive oxide film is formed by the sol-gel method described hereinbelow instead of using the normal vacuum film forming technique such as the sputtering method.

Figure 2:
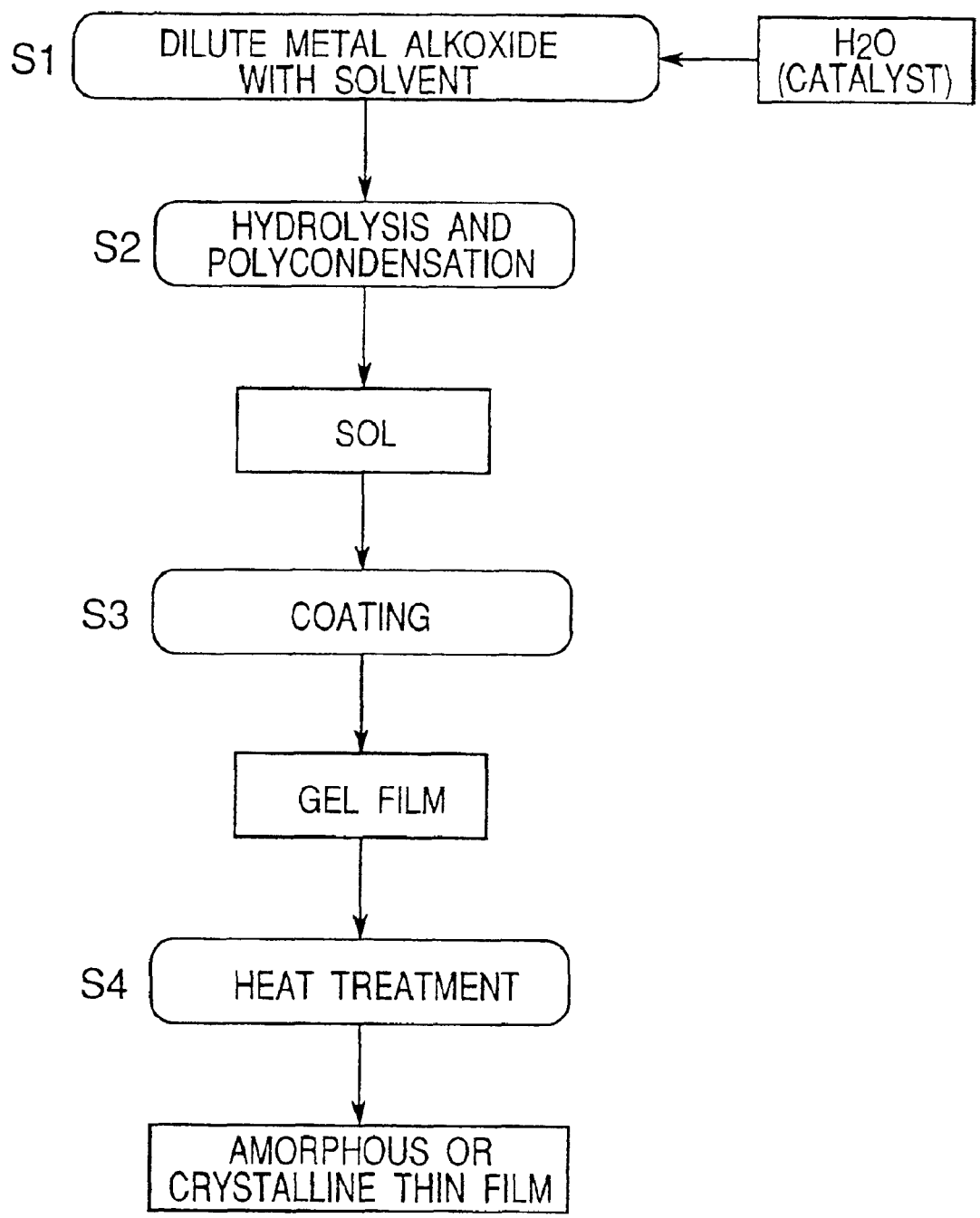
FIG. 2 is a chart showing a procedure for forming a thin film by the sol-gel method with a metal alkoxide employed as a material.

The above-mentioned sol-gel method is the method of employing an organic or inorganic compound of a metal as a solution, solidifying sol into gel by promoting hydrolysis and polycondensation reactions of compounds in the solution and forming an oxide solid by heating the gel. FIG. 2 shows an example of a procedure for forming a thin film by the sol-gel method with a metal alkoxide employed as a material. As a start material, the metal alkoxide that can be subjected to polycondensation is appropriate, however, it is acceptable to employ a metallic salt or a metallic acetylacetonate complex if it is used together with the metal alkoxide. As a solution, it is general to employ a variety of alcohols. The metal alkoxide is diluted in the solution (step S1), and thereafter water is added to cause the hydrolysis and polycondensation reactions for the formation of a sol (step S2). Then, the sol is coated on the substrate to form a gel film (step S3). As a coating method, there is used the dipping method, the spin-coating method, the meniscus costing method or the like. Subsequently, the gel film is dried and subjected to heat treatment at a temperature of about 500° C. for the removal of the residual organic matter (step S4). An oxide film is thus formed.

A transparent conductive oxide film can be simply formed by coating a sol-gel solution on the glass substrate 21 and baking the same if the aforementioned sol-gel method is used. Therefore, a film can be formed without using any vacuum film forming apparatus, and this enables the formation of a film at low cost. Also, the method can easily cope with film formation in a large area.

The details of the type, theory and so on of the oxide film that can be formed by the sol-gel method are described in detail in "Science of Sol-Gel Method" that is written by Sumio Sakka and issued by Agune Shoufu-Sha. Examples of the film formation of ITO, or the transparent conductive oxide film, is reported by "ITO Thin Film Formation by Sol-Gel Method", Journal of the Ceramic Society of Japan, vol.102, No.2, pp.200–205(1994) and so on.

Next, the transparent conductive oxide film formed by the sol-gel method is patterned to the shapes of the pixel electrodes 22. As a patterning method, there is a general method for forming a resist of a specified pattern on the aforementioned transparent conductive oxide film by the technique of photolithography or the like and removing the unnecessary transparent conductive oxide film by the wet etching or dry etching. For example, HBr or ferric chloride aqueous solution can be used for etching in the case where ITO is employed as the transparent conductive oxide film.

As a more preferable patterning method, there is a method for performing patterning without using any resist by providing the sol-gel material itself with photosensitivity when forming a transparent conductive oxide film by the sol-gel method. For example, if a gel film is formed by using a metal alkoxide chemically modified with a chelating agent such as acetylacetone (AcAc) or benzoylacetone (BzAc), then the gel film comes to have a solubility largely varied by ultraviolet irradiation. That is, the gel film to which ultraviolet rays are irradiated has a severed chelate bond and becomes insoluble in an alkaline solution and alcohol. It is to be noted that the method of imparting photosensitivity to the sol-gel material by adding β-diketone compound of AcAc, BzAc or the like as the aforementioned chelating agent is described in the reference document of "Effects of UV-Irradiation on the Formation of Oxide Thin Films from Chemically Modified Metal-Alkoxides", Journal of Sol-Gel Science and Technology, 2, pp.581–585 (1994) and so on.

It is also possible to provide a sol-gel material with photosensitivity by separately adding a photosensitive resin to the sol-gel material that is not chemically modified. Specifically, by blending a sol-gel material for forming a transparent conductive oxide film with a resin having photosensitivity at an appropriate ratio, photosensitivity can be imparted to the sol-gel material. For example, if ultraviolet rays are irradiated to the precursor film of a material obtained by blending a sol-gel material with a monomer (an acrylic monomer, for example) having photopolymerizability and a polymerization initiator, then the monomer is polymerized to form a reticulated polymer (polymer network), where the sol-gel material exists in the spaces of the polymer network. Thereafter, by subsequently performing a development process, only the film of the polymerized portion to which ultraviolet rays have been irradiated remains as a negative pattern, and the sol-gel material in the portion that has not undergone irradiation is dissolved in the developing fluid together with the unpolymerized monomer.

Finally, baking is performed at a temperature of about 500° C. for the removal of the residual organic matter in the polymer network and the sol-gel material. It is to be noted that a negative type photoresist available on the market can also be employed as the aforementioned photosensitive resin.

As another patterning method, it is possible to perform patterning by selectively irradiating excimer laser light to a normal gel film that has no photosensitivity for the decomposition of the gel film.

Figure 3:
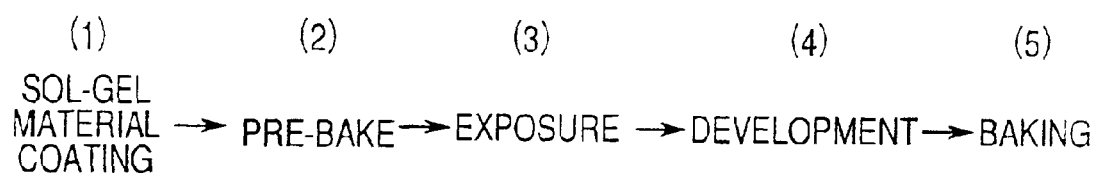
FIG. 3 is a chart showing a procedure for forming a pixel electrode that employs a sol-gel material having photosensitivity.
Figure 4:
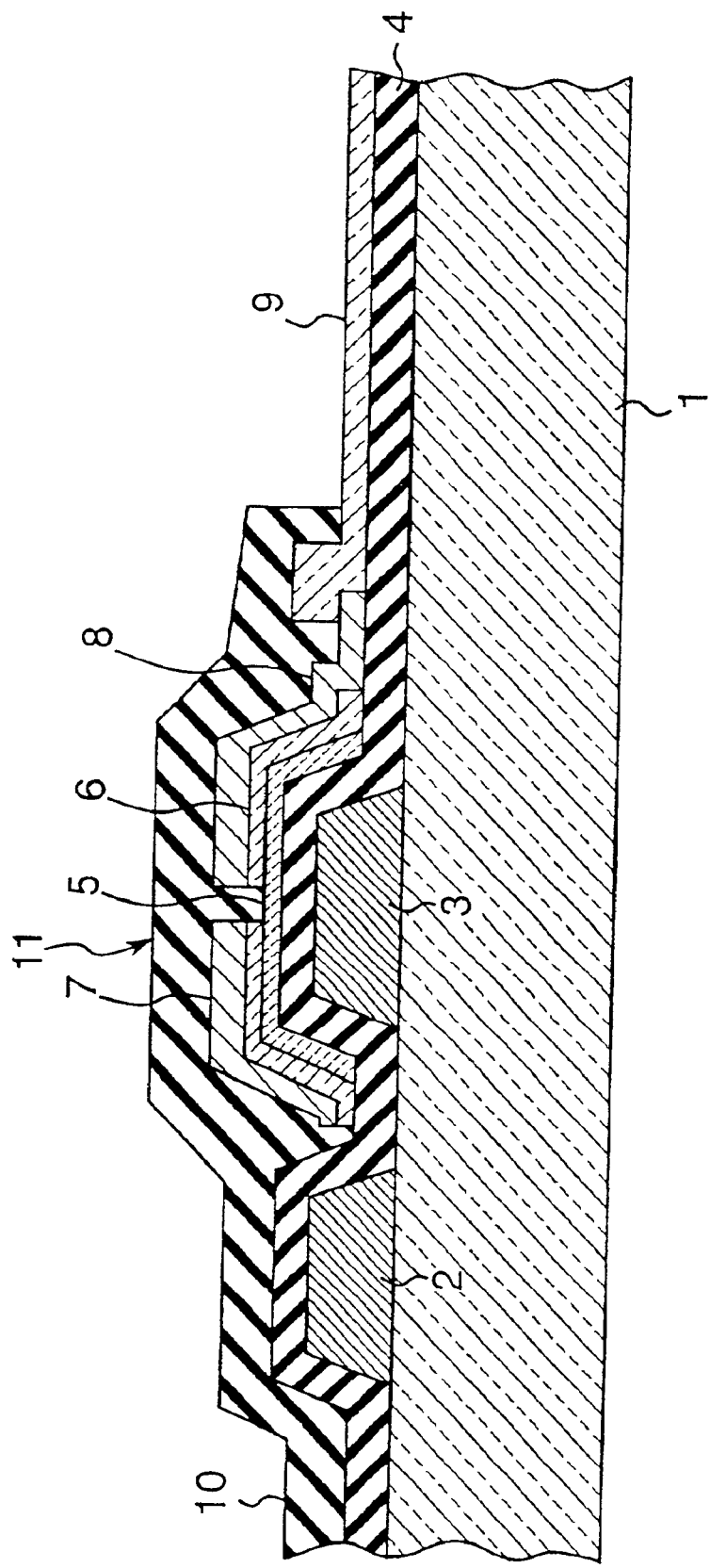
FIG. 4 is a sectional view of a conventional active matrix substrate.

FIG. 3 shows a procedure for forming the pixel electrode 22 by means of the aforementioned sol-gel material provided with photosensitivity. In step (1), the sol-gel material that has been provided with photosensitivity as described above is coated on the glass substrate 21 by the dipping method, the spin-coating method, the meniscus costing method or the like for the formation of a transparent conductive oxide film. Pre-baking is performed in step (2), and the resulting material is exposed to ultraviolet rays or the like. A development process is performed to leave a negative pattern in step (4). Baking is performed at a temperature of about 500° C. in step (5).

Figure 5:
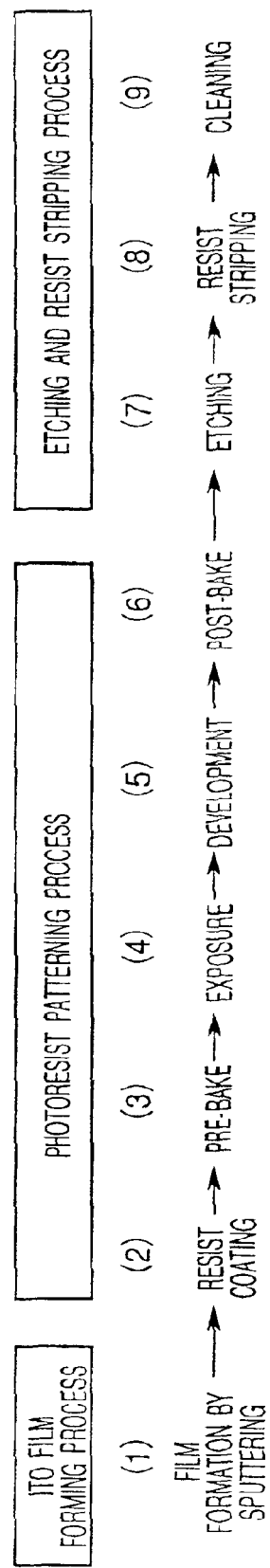
FIG. 5 is a chart showing patterning processes of a pixel electrode in FIG. 4.

As described above, by forming the pixel electrode 22 with the sol-gel material provided with photosensitivity, it is enabled to reduce the fabricating processes shown in FIG. 5 by eliminating the processes of resist coating, post-bake, etching, resist stripping and cleaning. Therefore, the fabricating process can be reduced in addition to the merit that the film can be formed at low cost using no vacuum film forming apparatus. An investment for the equipment of the fabricating apparatus can be reduced, and the cost reduction of the active matrix substrate itself can also be achieved.

(Formation of Scanning Electrode 23)

Upon completing the formation of the pixel electrodes 22 as described hereinabove, then the scanning electrodes 23 constructed of a metal film and the gate electrodes 25 connected to the scanning electrodes 23 are formed to a thickness of 0.1 $\mu$m to 0.5 $\mu$m on the glass substrate 21 on which the pixel electrodes 22 has been formed. That is, a film of Ta, Al, Mo, Cr or the like is formed by the sputtering method and patterned into a specified shape by the photolithographic technique and the etching technique. It is to be noted that the highest temperature applied to the laminate structure during the process of forming the scanning electrodes 23 is 100° C. to 250° C. in the film forming stage by sputtering.

(Formation of TFT's 24)

Next, a gate insulating film (having a thickness of 0.3 $\mu$m to 0.4 $\mu$m) 26 made of SiNx or SiO$_2$, a channel layer (having a thickness of 0.03 $\mu$m to 0.1 $\mu$m) 27 constructed of a-Si (i-(intrinsic) layer) and a contact layer (having a thickness of 0.05 $\mu$m to 0.15 $\mu$m) 28 for source and drain electrodes constructed of a-Si (n$^+$-layer) are formed on the obtained laminate structure by the plasma CVD (Chemical Vapor Deposition) method, and they are patterned into specified shapes by the photolithographic technique and the etching technique. It is to be noted that the highest temperature applied to the laminate structure during the process of forming the TFT's 24 is 300° C. to 350° C. in the film forming stage by plasma CVD.

(Formation of Signal Electrode)

Next, a signal electrode (having a thickness of 0.1 $\mu$m to 0.5 $\mu$m) constructed of a metal film and source and drain electrodes (having a thickness of 0.1 $\mu$m to 0.5 $\mu$m) 29 and 30 of the TFT's 24 are formed on the obtained laminate structure. That is, a film of Ta, Al, Mo, Cr or the like is formed by the sputtering method and patterned into a specified shape by the photolithographic technique and the etching technique. It is to be noted that the highest temperature applied to the laminate structure during the process of forming the signal electrode is 100° C. to 250° C. in the film forming stage by sputtering.

(Formation of Insulative Protecting Film 31)

Next, an insulative protecting film 31 made of SiNx or SiO$_2$ is formed on the obtained laminate structure by the plasma CVD method, and it is patterned into a specified shape by the photolithographic technique and the etching technique. It is to be noted that the highest temperature applied to the laminate structure during the process of forming the insulative protecting film 31 is 300° C. to 350° C. in the film forming stage by plasma CVD.

Through the aforementioned processes, the active matrix substrate of the present embodiment is completed. The present active matrix substrate is characterized in that the pixel electrodes 22 are constructed of a transparent conductive oxide film formed of a sol-gel material and are formed before the formation of the scanning electrodes 23, the signal electrodes and the TFT's 24.

In general, the sol-gel material can be coated by the spin-coating method or the dipping method. Therefore, by employing a sol-gel material, transparent pixel electrodes 22 can be formed without needing any vacuum film forming apparatus, and the fabricating processes of the pixel electrodes 22 can be reduced.

In general, the sol-gel material needs high-temperature baking at a temperature of about 500° C. in the film forming stage for the removal of the residual organic matter. Therefore, if the pixel electrodes 22 are formed by the sol-gel method after the formation of the TFT's 24 and the electrode wiring lines, then the following problems occur.

That is, in the case of the aforementioned active matrix substrate, the a-Si film is formed by adding hydrogen at a temperature of 300° C. to 350° C. by the plasma CVD method when forming the TFT's 24. Therefore, if the obtained a-Si film is exposed to a high temperature higher than the temperature at which the a-Si film is formed, then the separation of hydrogen occurs to change the characteristic of the a-Si film. That is, the device characteristics of the TFT's 24 are deteriorated. Furthermore, with regard to the electrode wiring lines constructed of a metal film, there occurs the problem that the surface of the metal film is oxidized when the metal film is baked at the high temperature of 500° C., causing deterioration in electric characteristics.

However, in the present embodiment, the pixel electrodes 22 are formed before the processes of forming the electrode wiring lines and the TFT's 24. Therefore, even if the heat resistance temperature of the electrode wiring lines and the TFT's 24 is about 350° C., an active matrix substrate can be formed without inflicting damage to the electrode wiring lines and the TFT's 24.

The aforementioned active matrix substrate is not required to be etched with photoresist in patterning by forming the transparent conductive oxide film that constitutes the pixel electrodes 22 with a sol-gel material that has photosensitivity. Therefore, the processes can be reduced by eliminating the photoresist patterning process and the etching process as shown in FIG. 3, as compared with the conventional patterning process (see FIG. 5) that uses a photoresist. Therefore, the fabricating processes can be reduced in addition to the nonnecessity of a vacuum system for the fabricating apparatus, and the investment for the equipment of the fabricating apparatus can be reduced. Also, cost reduction of the active matrix substrate itself can be achieved.

Furthermore, the active matrix substrate of the aforementioned embodiment employs ITO and $SnO_2$ as a material for the pixel electrode 22 formed by the sol-gel method. These materials have a corrosion resistance to chemical liquids and gases necessary for the processing processes of the other members that constitute the present active matrix substrate. For example, the substances of ITO and $SnO_2$ have a weak corrosion resistance to some acids such as HCl and HBr, however, they have a resistance to the other chemical liquids and gases (etching liquid and etching gas of metal and semiconductor materials, photoresist, developing liquid, resist stripper, substrate cleaning liquid and so on). Therefore, it is facilitated to firstly form the pixel electrodes 22 and subsequently form the electrode wiring lines and the TFT's 24. Furthermore, doping the substances of ITO and $SnO_2$ with Sb also enables the reduction in resistance of the transparent conductive oxide film.

In particular, the substance of $SnO_2$, which has a strong corrosion resistance and is hard to be patterned, has not conventionally been employed for the pixel electrodes of the active matrix substrate. However, according to the aforementioned embodiment, employing the sol-gel material that has photosensitivity as described above facilitates patterning and enables the application of the material to the pixel electrodes 22. The substance of $SnO_2$ has a transmittance to visible light superior to that of the aforementioned ITO. Therefore, by employing the substance of $SnO_2$ for the pixel electrodes 22, an active matrix substrate having an excellent transmittance, i.e., excellent light utilization efficiency can be formed.

It is to be noted that the active matrix substrate of the aforementioned embodiment can be used generally for the flat panel type display devices of the active matrix drive type and other two-dimensional image detectors and the like that have a flat panel shape.

In particular, the active matrix drive type LCD's are gaining rapidly increasing popularity on the market in the fields of notebook type PC (personal computer), desk-top PC, general TV (television), high-vision (high definition) TV, car navigation and so on taking advantage of the various characteristics of a small depth of the display device, a small consumption of power, no distortion occurring due to the flat screen, no influence received from geomagnetism, a capability of providing a high resolution of about 200 ppi (pixels per inch) and so on, as compared with CRT (cathode ray tube), and the LCD's themselves are required to be reduced in cost. In response to the requirement of cost reduction of LCD's, the fabrication of LCD's with the aforementioned active matrix substrate enables the achievement of cost reduction of LCD's.

Although the substance of ITO or $SnO_2$ is employed as a material for the pixel electrodes according to the description of the aforementioned embodiment, the present invention is not limited to the above-mentioned materials. It is only essential that the material is a transparent conductive oxide film capable of being formed of a sol-gel material, and it is also acceptable to employ a film of indium oxide, zinc oxide, germanium oxide, titanium oxide or the like or a film of a mixture of these substances.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An active matrix substrate fabricating method for fabricating an active matrix substrate having electrode wiring lines arranged in a matrix form, a plurality of active elements provided at intersections of the electrode wiring lines and a plurality of pixel electrodes connected to the electrode wiring lines via the active elements on an insulating substrate, comprising the step of:

forming the pixel electrodes of a sol-gel material in a process preceding processes forming constituent elements of the electrode wiring lines and the active elements.

2. An active matrix substrate as claimed in claim 1, wherein no constituent member of the electrode wiring lines and the active elements exists between the pixel elements and the insulating substrate.

3. A liquid crystal display device including the active matrix substrate fabricated by the active matrix substrate fabricating method claimed in claim 2.

4. The active matrix substrate as claimed in claim 1, wherein the sol-gel material forming the pixel electrodes, the electrode wiring lines and active elements each are treated with heat, the heat treatment of said pixel electrodes being at a temperature higher than the heat treatment temperatures of the electrode wiring lines and the active elements.

5. A liquid crystal display device including the active matrix substrate fabricated by the active matrix substrate fabricating method claimed in claim 4.

6. An active matrix substrate as claimed in claim 1, wherein the pixel electrodes are principally made of any one of indium tin oxide, tin oxide, indium oxide zinc oxide, germanium oxide and titanium oxide or a mixture of these substances.

7. A liquid crystal display device including the active matrix substrate fabricated by the active matrix substrate fabricating method claimed in claim 6.

8. An active matrix substrate fabricating method according to claim 1, wherein:

the pixel electrodes are formed by patterning a sol-gel material having photosensitivity.

9. An active matrix substrate fabricating method as claimed in claim 8, wherein a chelating agent for imparting photosensitivity is added to the sol-gel material.

10. A liquid crystal display device including the active matrix substrate fabricated by the active matrix substrate fabricating method claimed in claim 9.

11. An active matrix substrate fabricating method as claimed in claim 8, wherein a photosensitive resin for imparting photosensitivity is added to the sol-gel material.

12. A liquid crystal display device including the active matrix substrate fabricated by the active matrix substrate fabricating method claimed in claim 8.

13. A liquid crystal display device including the active matrix substrate fabricated by the active matrix substrate fabricating method claimed in claim 1.

* * * * *